United States Patent
Lee

(10) Patent No.: US 11,403,012 B2
(45) Date of Patent: Aug. 2, 2022

(54) MEMORY SYSTEM CAPABLE OF SAVING POWER CONSUMPTION AND OPERATION METHOD THEREOF

(71) Applicant: SK hynix Inc., Gyeonggi-do (KR)

(72) Inventor: Jong-Hwan Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 245 days.

(21) Appl. No.: 16/682,753

(22) Filed: Nov. 13, 2019

(65) Prior Publication Data
US 2020/0233596 A1    Jul. 23, 2020

(30) Foreign Application Priority Data

Jan. 23, 2019 (KR) .................. 10-2019-0008762

(51) Int. Cl.
G06F 3/06 (2006.01)

(52) U.S. Cl.
CPC .......... G06F 3/0634 (2013.01); G06F 3/0625 (2013.01); G06F 3/0659 (2013.01); G06F 3/0679 (2013.01)

(58) Field of Classification Search
CPC ...... G06F 1/324; G06F 1/3275; G06F 1/3228; G06F 3/0659; G06F 3/0634
See application file for complete search history.

(56) References Cited

U.S. PATENT DOCUMENTS

| | | | | |
|---|---|---|---|---|
| 2005/0143146 A1* | 6/2005 | Kim | .................. | H04W 52/0248 455/574 |
| 2012/0017099 A1* | 1/2012 | David | .................... | G06F 1/3296 713/300 |
| 2012/0102344 A1* | 4/2012 | Kocev | .................... | G06F 1/3287 713/322 |
| 2014/0281600 A1* | 9/2014 | Wells | .................... | G06F 3/0634 713/320 |
| 2015/0185797 A1* | 7/2015 | Cooper | ................. | G06F 1/3296 713/340 |
| 2015/0287444 A1* | 10/2015 | Lee | ....................... | G11C 7/1045 713/322 |
| 2017/0199693 A1* | 7/2017 | Fong | ...................... | G06F 1/3287 |
| 2018/0011527 A1* | 1/2018 | Kim | ....................... | G06F 3/0625 |
| 2018/0182452 A1* | 6/2018 | Lee | ........................ | G11C 5/063 |
| 2019/0377402 A1* | 12/2019 | Chao | ...................... | G06F 1/3275 |
| 2020/0142620 A1* | 5/2020 | Yuan | ...................... | G06F 3/0604 |
| 2020/0333967 A1* | 10/2020 | Ogawa | .................. | G06F 3/0679 |
| 2021/0011537 A1* | 1/2021 | Jeon | ....................... | G06F 3/0679 |
| 2021/0247916 A1* | 8/2021 | Jung | ....................... | G06F 1/3228 |

FOREIGN PATENT DOCUMENTS

| | | |
|---|---|---|
| KR | 10-2002-0008594 | 1/2002 |
| KR | 10-1547418 | 8/2015 |
| KR | 10-2016-0124990 | 10/2016 |

* cited by examiner

*Primary Examiner* — Raymond N Phan
(74) *Attorney, Agent, or Firm* — IP & T Group LLP

(57) ABSTRACT

A memory system may include: a memory device suitable for storing data; and a controller suitable for controlling the memory device. The controller may include: a power manager suitable for deciding whether to operate in a power saving mode based on current time; a phase locked loop suitable for generating a clock whose frequency is lowered depending on the deciding whether to operate in the power saving mode; and a processor suitable for operating at speed based on the clock.

21 Claims, 8 Drawing Sheets

… (1)

MEMORY SYSTEM CAPABLE OF SAVING POWER CONSUMPTION AND OPERATION METHOD THEREOF

CROSS-REFERENCE TO RELATED APPLICATION

This application claims priority under 35 U.S.C. § 119 to Korean Patent Application No. 10-2019-0008762, filed on Jan. 23, 2019, which is incorporated herein by reference in its entirety.

BACKGROUND

1. Field

Various embodiments relate to a memory system.

2. Discussion of the Related Art

The computer environment paradigm has been transitioning to ubiquitous computing, which enables computing systems to be used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Since they have no moving parts, memory systems provide advantages such as excellent stability and durability, high information access speed, and low power consumption. Examples of memory systems having such advantages include universal serial bus (USB) memory devices, memory cards having various interfaces, and solid state drives (SSDs).

SUMMARY

Various embodiments are directed to a memory system capable of saving power consumption, and an operation method thereof.

In an embodiment, a memory system may include: a memory device suitable for storing data; and a controller suitable for controlling the memory device. The controller may include: a power manager suitable for deciding whether to operate in a power saving mode based on current time; a phase locked loop suitable for generating a clock whose frequency is lowered depending on the deciding whether to operate in the power saving mode; and a processor suitable for operating at speed based on the clock.

In an embodiment, there is provided an operation method of a memory system which includes a memory device and a controller suitable for controlling the memory device. The operation method may include: deciding whether to operate in a power saving mode based on current time; lowering the frequency of a clock to generate a low frequency clock when deciding to operate in the power saving mode; and operating at a decreased speed based on the low frequency clock.

In an embodiment, there is provided a controller for controlling a memory device. The controller may include: a phase locked loop suitable for generating a clock; a processor suitable for operating in response to the clock; and a power manager suitable for receiving time information regarding a current time from a host and generating a signal based on the time information, wherein the phase locked loop decreases a frequency of the clock in response to the signal.

DETAILED DESCRIPTION

Various embodiments of the present invention are described below with reference to the accompanying drawings. It should be understood that the following description is focused on aspects and features of embodiments of the invention. To that end, description of well-known technical material may be omitted in order not to unnecessarily obscure subject matter of the present invention.

Throughout the specification, reference to "an embodiment," "another embodiment" or the like is not necessarily to only one embodiment, and different references to any such phrase are not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Figure 1:
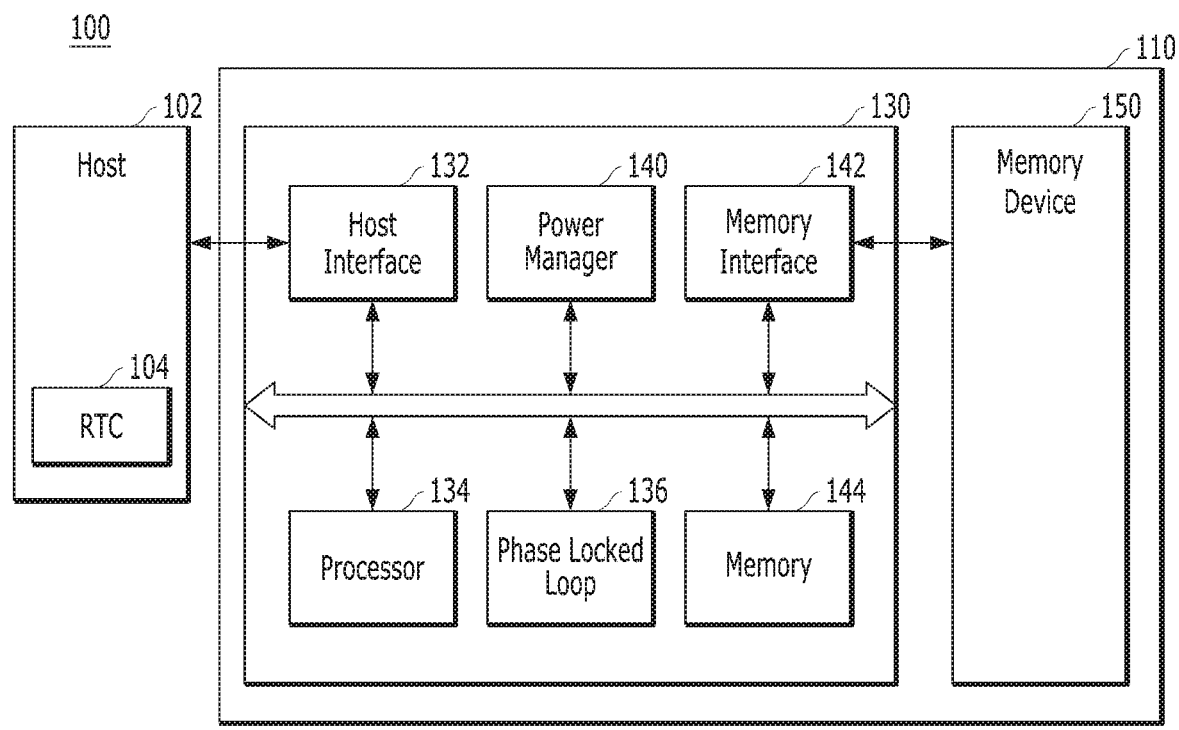
FIG. 1 is a diagram schematically illustrating a data processing system including a memory system in accordance with an embodiment.

FIG. 1 schematically illustrates a data processing system 100 including a memory system 110 in accordance with an embodiment.

Referring to FIG. 1, the data processing system 100 may include a host 102 and the memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102. The host 102 may provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user.

The personal OS may be configured to support a function of providing a service to general users and may include Windows and Chrome. The enterprise OS may be configured to secure and support high performance and may include Windows server, Linux and Unix. Furthermore, the mobile OS may be configured to support a function of providing a mobile service to users and a power saving function of a system and may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by any of various types of storage devices. Examples of such storage devices include, but are not limited to, volatile memory devices such as a dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102. The controller 130 may control an operation of storing data in the memory device 150.

The controller 130 and the memory device 150 may be integrated into a single semiconductor device. For example, the controller 130 and the memory device 150 may be integrated as one semiconductor device to constitute a solid state drive (SSD). When the memory system 110 is used as an SSD, the operating speed of the host 102 connected to the memory system 110 can be improved. Alternatively, the controller 130 and the memory device 150 may be integrated as one semiconductor device to constitute a memory card, such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD card, micro-SD card and SDHC card, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device that retains data stored therein even though power is not supplied. The memory device 150 may store data provided from the host 102 through a write operation, and provide data stored therein to the host 102 through a read operation. The memory device 150 may include a plurality of memory blocks 152, 154, 156. Each of the memory blocks may include a plurality of pages. Each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide the host 120 with data read from the memory device 150, and store data provided from the host 102 in the memory device 150. For this operation, the controller 130 may control read, write and erase operations of the memory device 150.

The controller 130 may include a host interface 132, a processor 134, a phase locked loop 136, a power manager 140, a memory interface 142 and a memory 144, which are operably coupled to one another through an internal bus.

The host interface 132 may be configured to process a command and data of the host 102. The host interface 132 may communicate with the host 102 through one or more of various interface protocols, such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and/or integrated drive electronics (IDE).

The memory interface 142 may serve as a memory/storage interface for interfacing the controller 130 and the memory device 150 such that the controller 130 controls the memory device 150 in response to a request from the host 102. When the memory device 150 is a flash memory, specifically a NAND flash memory, the memory interface 142 may generate a control signal for the memory device 150 and process data to be provided to the memory device 150 under the control of the processor 134. The memory interface 142 may work as an interface (e.g., a NAND flash interface) for processing a command and data between the controller 130 and the memory device 150. Specifically, the memory interface 142 may support data transfer between the controller 130 and the memory device 150.

In an embodiment, the memory interface 142 may include an error correction code (ECC) circuit capable of detecting and correcting an error contained in data read from the memory device 150. The ECC circuit may perform an error correction decoding process on data read from the memory device 150 through an error correction code used in an ECC encoding process. According to the result of the error correction decoding process, the ECC circuit may output a signal such as an error correction success/fail signal. When the number of error bits exceeds the number of correctable error bits, the ECC circuit may not correct the error bits, but instead output the error correction fail signal.

The memory 144 may serve as a working memory of the memory system 110 and the controller 130, and store data for driving the memory system 110 and the controller 130. The controller 130 may control the memory device 150 to perform read, program and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be embodied by a volatile memory. For example, the memory 144 may be embodied by a static random access memory (SRAM) or dynamic random access memory (DRAM). The memory 144 may be disposed within or externally to the controller 130. FIG. 1 exemplifies the memory 144 disposed within the controller 130. In another embodiment, the memory 144 may be embodied by an external volatile memory having a memory interface transferring data between the memory 144 and the controller 130.

As described above, the memory 144 may store data for performing a data write/read operation between the host and the memory device 150 and data when the data write/read operation is performed. In order to store such data, the memory 144 may include a program memory, data memory, write buffer/cache, read buffer/cache, data buffer/cache, map buffer/cache or the like.

The processor 134 may control the overall operations of the memory system 110. The processor 134 may drive firmware to control the overall operations of the memory system 110. The firmware may be referred to as flash translation layer (FTL). The processor 134 may be realized as a microprocessor or a central processing unit (CPU).

For example, the controller 130 may perform an operation requested by the host 102 through the processor 134. In other words, the controller 130 may perform a command operation corresponding to a command received from the host 102. The controller 130 may perform a foreground operation as the command operation corresponding to the command received from the host 102. For example, the controller 130 may perform a program operation corresponding to a write command, a read operation corresponding to a read command, an erase operation corresponding to an erase command, and a parameter set operation corresponding to a set parameter command or a set feature command.

The controller 130 may perform a background operation on the memory device 150 through the processor 134. For example, the background operation may include a garbage collection (GC) operation, a wear leveling (WL) operation, a map flush operation, and a bad block management operation.

The phase locked loop 136 may generate a uniform clock, and provide the clock to the processor 134. The processor 134 may perform an operation based on the clock. In an embodiment, the phase locked loop 136 may include a clock oscillator, a loop circuit, a frequency divider and a mode register. The clock oscillator may generate an oscillating clock in a set period. The loop circuit may generate a uniform clock by synchronizing the phase of the oscillating clock with a reference clock. The frequency divider may adjust the frequency of the clock. The mode register may change the frequency of the clock by setting a mode of the frequency divider.

The power manager 140 may control power supply to the host interface 132, the processor 134, the phase locked loop 136, the memory interface 142 and the memory 144.

When the phase locked loop 136 provides a high-frequency clock to the processor 134, the operation speed of the processor 134 may be increased. In this case, the power manager 140 may provide a large amount of power to the phase locked loop 136 and the processor 134 such that the phase locked loop 136 generates a high-frequency clock and the processor 134 operates at high speed. On the other hand, when the phase locked loop 136 provides a low-frequency clock to the processor 134, the operation speed of the processor 134 may be decreased. In this case, the power manager 140 may provide only a small amount of power to the phase locked loop 136 and the processor 134. That is, the operation speed of the processor 134 and the power consumption of the controller 130 may have a trade-off relation.

Users may not request the memory system 110 to operate at high speed for an entire day. For example, users may not use the host 102 much for a certain period of the day, e.g., in the nighttime. Furthermore, in many cases, requests that the memory system 110 receives from the host 102 in the nighttime are not requests of users, but system requests of the host 102.

On the other hand, users may frequently use the host 102 and frequently access the memory system 110 in a different period of the day, e.g., in the daytime. That is, users may expect the memory system 110 to operate at high speed in the daytime.

In this specification, a time zone or period in which users frequently use the host 102 may be defined as an active time zone or period, and a time zone or period in which users seldom use the host 102 may be defined as an inactive time zone or period. The active time zone and the inactive time zone may be experimentally decided and stored in the memory system 110. For example, the active time zone may be the daytime, and the inactive time zone may be the nighttime. For example, daytime may be from 6 AM to 6 PM and nighttime may be from 6 PM to 6 AM. More generally, the active and inactive time zones may represent respective mutually exclusive time periods, which collectively represent an entire day, in which a user often uses the host 102 and in which a user seldom uses the host 102. The active and inactive time zones/periods need not be equal in duration, and may be different for different systems.

The host 102 may recognize the current time. FIG. 1 illustrates the host 102 that can recognize the current time through a real-time clock (RTC) 104. The memory system 110 may recognize the current time by receiving time information from the host 102.

In an embodiment, the memory system 110 may operate in a power saving mode when the current time is within the inactive time zone, and cancel the power saving mode when the current time is within the active time zone. In an embodiment, when the memory system 110 operates in the power saving mode, the clock frequency provided by the phase locked loop 136 may be lowered to reduce the power consumption of the memory system 110. In an embodiment, the memory system 110 may provide high operation performance to users in the active time zone, and reduce power consumption in the inactive time zone. That is, while the performance of the memory system 110, which users experience, is maintained, the power consumption of the memory system 110 may be reduced when the user is much less likely to be impacted by lower performance.

Figure 2:
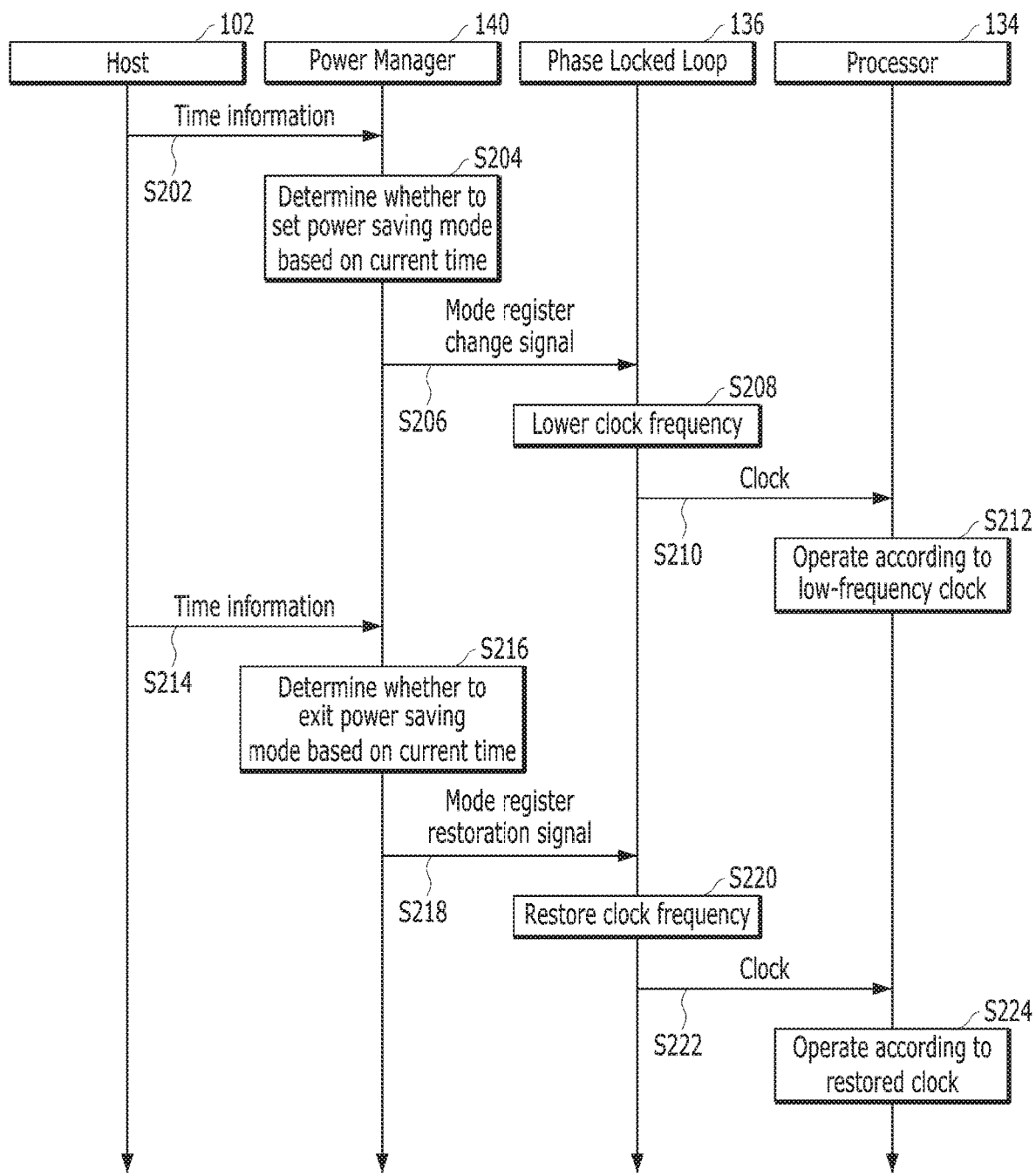
FIG. 2 is a flowchart illustrating an operation method of a data processing system including a memory system in accordance with an embodiment.

FIG. 2 is a flowchart illustrating an operation method of the data processing system 100 including the memory system 110 in accordance with an embodiment.

The following description is given in the context that the current time is within the active time zone, before step S202 is performed.

Referring to FIG. 2, in step S202, the power manager 140 may receive time information from the host 102 through the host interface 132.

In an embodiment, the host 102 may provide time information to the power manager 140 in a set period. In an embodiment, when the controller 130 requests time information while providing the host 102 with a response to a request of the host 102, the host 102 may provide the time information to the power manager 140 in response to the request. The time information may indicate the time when the host 102 provides the time information to the power manager 140. The power manager 140 may determine the current time based on the time information.

In step S204, the power manager 140 may determine whether to set the power saving mode of the memory system 110 based on the current time. Specifically, the power manager 140 may set the power saving mode of the memory system 110 when the current time which has been in the active time zone enters the inactive time zone.

In step S206, the power manager 140 may provide a mode register change signal to the phase locked loop 136 in order to reduce power consumption of the memory system 110.

In step S208, the phase locked loop 136 may lower the clock frequency by changing data of the mode register in response to the mode register change signal.

In step S210, the phase locked loop 136 may generate a low-frequency clock and provide the low-frequency clock to the processor 134.

In step S212, the processor 134 may operate according to the low-frequency clock. Therefore, in the inactive time zone, the power consumption of the memory system 110 may be reduced.

In step S214, the power manager 140 may again receive time information from the host 102 through the host interface 132. The power manager 140 may determine the current time based on the time information.

In step S216, the power manager 140 may determine whether to exit the power saving mode of the memory system 110 based on the current time. Specifically, the power manager 140 may exit the power saving mode of the memory system 110 when the current time which has been in the inactive time zone enters the active time zone.

In step S218, the power manager 140 may provide a mode register restoration signal to the phase locked loop 136 in order to restore the operation speed of the memory system 110.

In step S220, the phase locked loop 136 may restore the clock frequency which was lowered in step S208, by changing the data of the mode register in response to the mode register restoration signal.

In step S222, the phase locked loop 136 may provide the clock having the restored (normal operating mode) frequency to the processor 134.

In step S224, the processor 134 may operate according to the restored clock. Therefore, in the active time zone, high operation performance of the memory system 110 may be provided.

As described with reference to FIG. 2, the power manager 140 may receive the time information from the host 102 whenever determining whether to set or exit the power saving mode of the memory system 110. However, the present invention is not limited thereto.

In an embodiment, the memory system 110 may further include a timer. The power manager 140 may determine the current time based on the timer and the time information received from the host 102. When the power manager 140 determines the current time based on the time information and the timer, the power manager 140 may not receive the time information from the host 102 whenever determining whether to enter or exit the power saving mode.

As described with reference to FIG. 1, the memory 144 may be implemented as a volatile memory. Therefore, the power manager 140 may supply power to the memory 144 in order to retain data stored in the memory 144 during operation of the memory system 110.

In the active time zone, users may frequently access the memory system 110 to input and/or output a large amount of data. Therefore, in the active time zone, the memory 144 may buffer a large amount of user data, and cache a large amount of map data. In the inactive time zone, however, the memory 144 may neither buffer a large amount of user data, nor cache a large amount of map data. Therefore, when the power manager 140 intends to supply power to the memory 144 in the inactive time zone in order to maintain power supply to a memory area where valid data are not stored, the power of the memory system 110 may be wasted.

In accordance with an embodiment, the memory 144 may include a plurality of sub memories. The memory system 110 may operate in the power saving mode when the current time is within the inactive time zone, and exit the power saving mode when the current time is within the active time zone. In an embodiment, when the memory system 110 operates in the power saving mode, the power manager 140 may disable one or more sub memories of the memory 144. Therefore, the memory system 110 may reduce power consumption in the inactive time zone.

Figure 3:
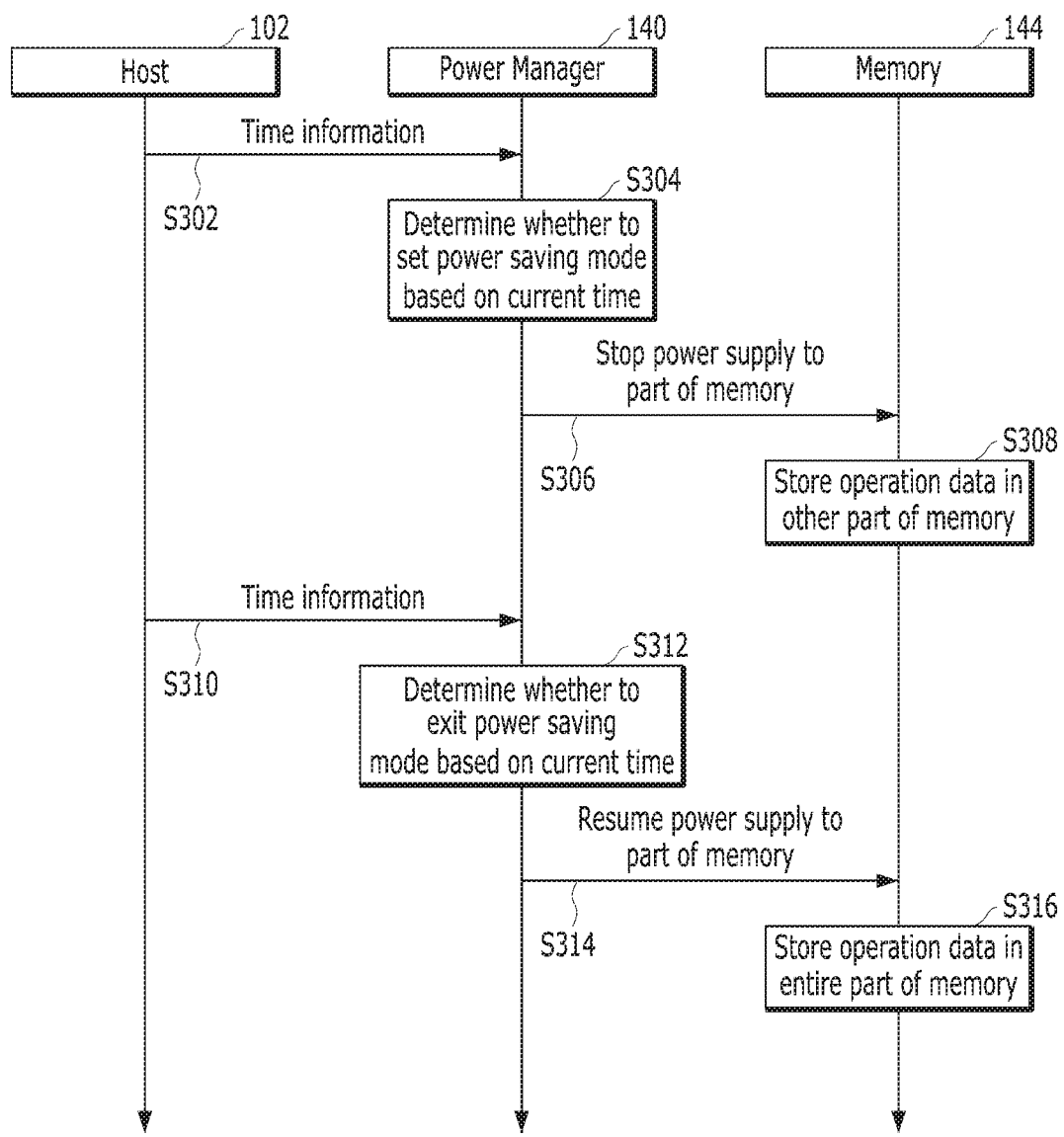
FIG. 3 is a flowchart illustrating an operation method of a data processing system including a memory system in accordance with an embodiment.

FIG. 3 is a flowchart illustrating an operation method of the data processing system 100 including the memory system 110 in accordance with an embodiment.

The following description is given in the context that the current time is within the active time zone, before step S302 is performed.

Referring to FIG. 3, in step S302, the power manager 140 may receive time information from the host 102 through the host interface 132. The power manager 140 may determine the current time based on the time information.

In step S304, the power manager 140 may determine whether to set the power saving mode of the memory system 110 based on the current time. Specifically, the power manager 140 may set the power saving mode of the memory system 110 when the current time which has been in the active time zone enters the inactive time zone.

In step S306, the power manager 140 may stop supply of power to a part of the memory 144. In an embodiment, when the power manager 140 stops supply of power to one or more sub memories, the processor 134 may not access the one or more sub memories. Therefore, in the inactive time zone, the power consumption of the memory system 110 may be reduced.

In an embodiment, the power manager 140 may control the memory 144 and the memory device 150 to flush data stored in the part of the memory 144 to the memory device 150, before stopping power supply to the part of the memory 144.

In step S308, the memory 144 may store operation data in the other part thereof, when a request is provided from the processor 134.

In step S310, the power manager 140 may again receive time information from the host 102 through the host interface 132. The power manager 140 may determine the current time based on the time information.

In step S312, the power manager 140 may determine whether to exit the power saving mode of the memory system 110 based on the current time. Specifically, the power manager 140 may exit the power saving mode of the memory system 110 when the current time which has been in the inactive time zone enters the active time zone.

In step S314, the power manager 140 may resume power supply to the part of the memory 144, where the power supply has been stopped.

In step S316, the entire memory 144 may store operation data of the memory system 110. Therefore, in the active time zone, the memory system 110 may provide high operation performance to users.

In an embodiment, the memory system 110 may operate in the power saving mode in the inactive time zone during which the user is not affected much by the operation performance of the memory system 110. Thus, it possible to reduce the power consumption of the memory system 110. In the active time zone, however, the memory system 110 may exit the power saving mode to provide high operation performance to users.

In an embodiment, when the power saving mode of the memory system 110 is set, the power manager 140 may control the phase locked loop 136 to perform any one of the operation of lowering the frequency of the clock and the operation of stopping power supply to a part of the memory 144. The power manager 140 may perform an additional operation other than the above-described operations in the power saving mode of the memory system 110, in order to reduce the power consumption of the memory system 110.

Referring to FIGS. 4 to 12, data processing systems and electronic devices to which the above-described memory system 110 including the memory device 150 and the controller 130 is applied are described below in more detail.

Figure 4:
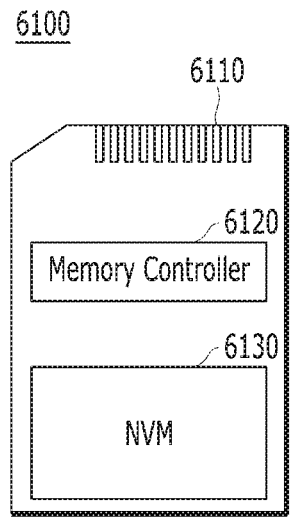
FIGS. 4 to 12 are diagrams schematically illustrating application examples of the data processing system, in accordance with various embodiments of the present invention.

FIG. 4 is a diagram schematically illustrating the data processing system including the memory system in accordance with an embodiment. FIG. 4 schematically illustrates a memory card system 6100 to which the memory system is applied.

Referring to FIG. 4, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols, such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and/or Bluetooth. Thus, the memory system and the data processing system in accordance with an embodiment may be applied to wired and/or wireless electronic devices, particularly mobile electronic devices.

The memory device 6130 may be implemented by a nonvolatile memory. For example, the memory device 6130 may be implemented by any of various nonvolatile memory devices, such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and/or a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multi-media card (e.g., MMC, RS-MMC, MMCmicro and eMMC), an secured digital (SD) card (e.g., miniSD card, microSD card and SDHC card) and/or a universal flash storage (UFS).

Figure 5:
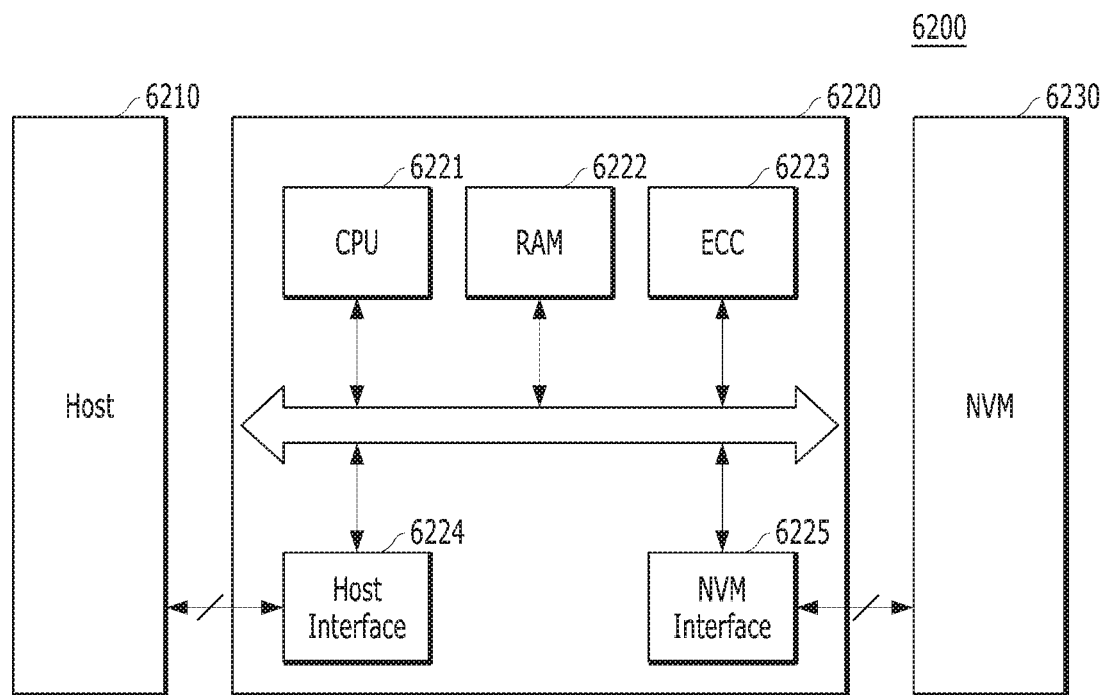

FIG. 5 is a diagram schematically illustrating another example of a data processing system 6200 including the memory system in accordance with an embodiment.

Referring to FIG. 5, the data processing system 6200 may include a memory device 6230 having one or more nonvolatile memories (NVMs) and a memory controller 6220 for controlling the memory device 6230. The data processing system 6200 may serve as a storage medium such as a memory card (e.g., CF card, SD card or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device

6230. When the RAM 6222 is used as a cache memory, the RAM 6222 may assist the memory device 6230 to operate at high speed.

The ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (PATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system in accordance with an embodiment may be applied to wired and/or wireless electronic devices, particularly a mobile electronic device.

Figure 6:
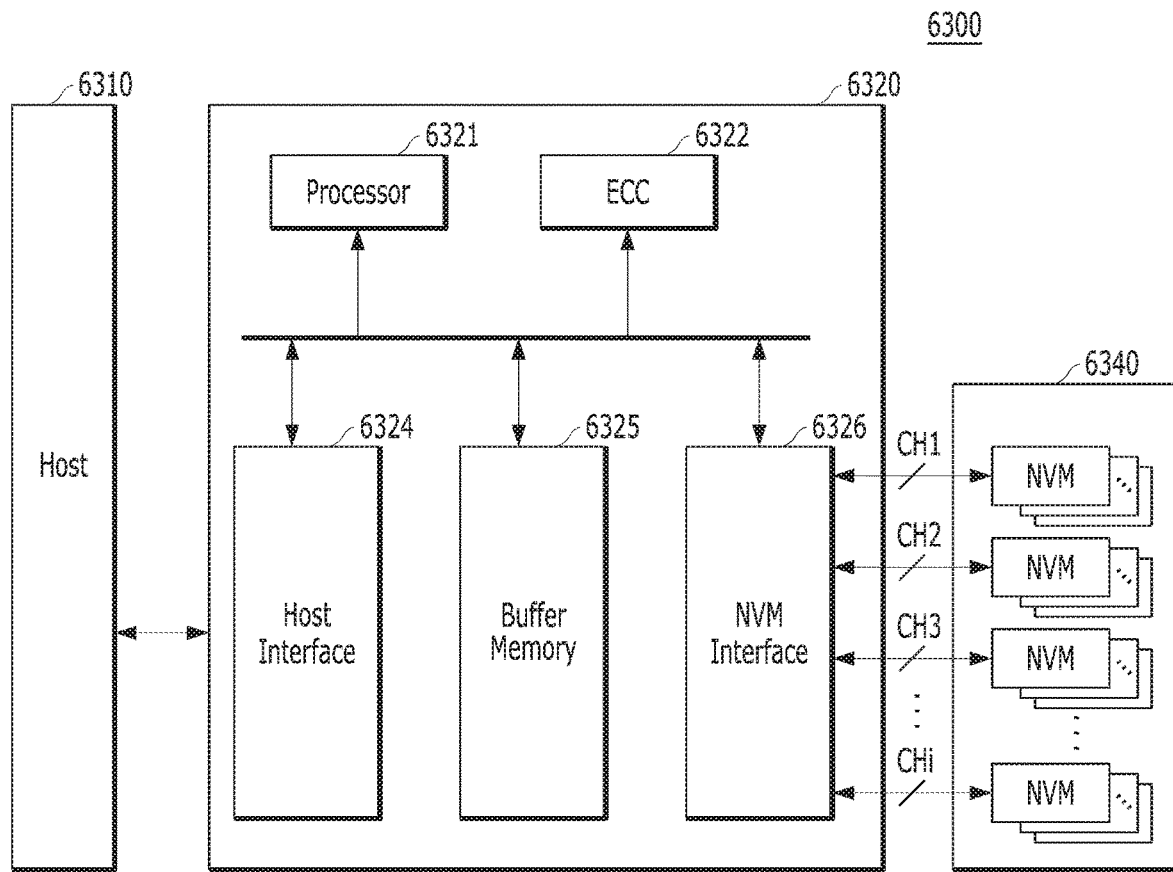

FIG. 6 is a diagram schematically illustrating another example of the data processing system including the memory system in accordance with an embodiment. FIG. 6 schematically illustrates a solid state drive (SSD) 6300 to which the memory system may be applied.

Referring to FIG. 6, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

Figure 10:
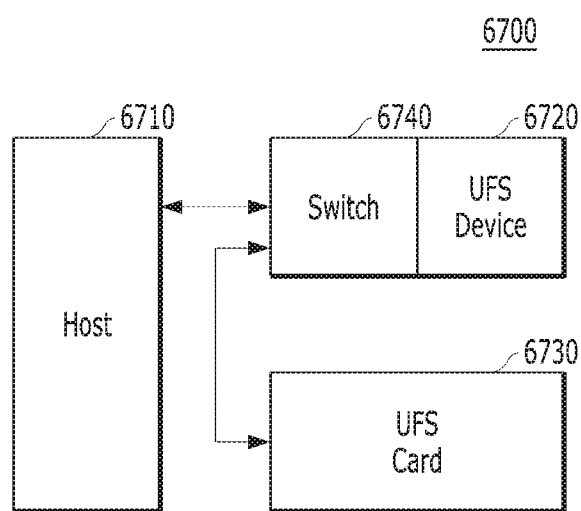

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of various volatile memories, such as dynamic random access memory (DRAM), synchronous DRAM (SDRAM), double data rate (DDR) SDRAM, low power DDR (LPDDR) SDRAM and graphics RAM (GRAM) or by any of various nonvolatile memories such as ferroelectric RAM (FRAM), resistive RAM (RRAM or ReRAM), spin-transfer torque magnetic RAM (STT-MRAM) and phase-change RAM (PRAM). By way of example, FIG. 10 illustrates that the buffer memory 6325 is disposed in the controller 6320. However, in another embodiment, the buffer memory 6325 may be disposed externally to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 7:
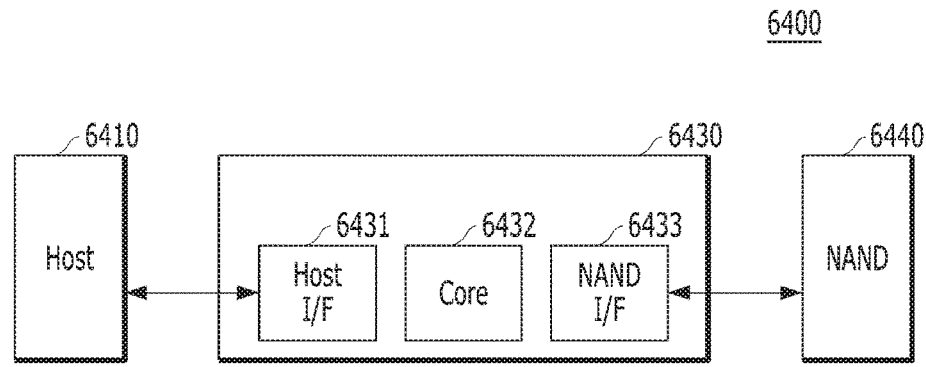

FIG. 7 is a diagram schematically illustrating another example of the data processing system including the memory system in accordance with an embodiment. FIG. 7 schematically illustrates an embedded Multi-Media Card (eMMC) 6400 to which the memory system may be applied.

Referring to FIG. 7, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

The memory controller 6120, the memory controller 6220, the controller 6320 and the controller 6430, which have been described with reference to FIGS. 4 to 7, may operate in the power saving mode depending on whether the current time is within the inactive time zone, and thus reduce power consumption of the memory card system 6100, the data processing system 6200, the SSD 6300 and the eMMC 6400, while still maintaining performance when needed by users.

FIGS. 8 to 11 are diagrams schematically illustrating other examples of the data processing system including the memory system in accordance with one or more embodiments. For example, FIGS. 8 to 11 schematically illustrate universal flash storage (UFS) systems to which the memory system may be applied.

Referring to FIGS. 8 to 11, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 5 to 8, and the UFS cards 6530, 6630, 6730 and 6830 may be embodied in the form of the memory card system 6100 described with reference to FIG. 4.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 8:
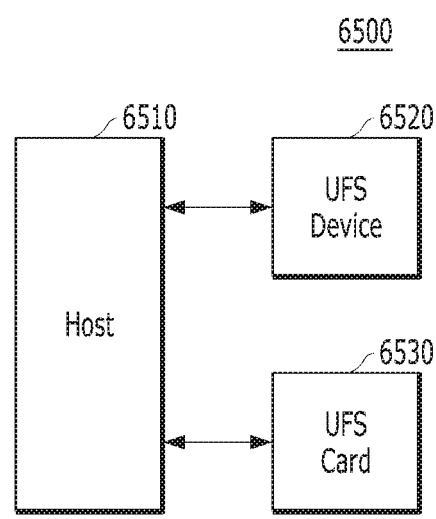

In the UFS system 6500 illustrated in FIG. 8, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In FIG. 8, the configuration in which one UFS device 6520 and one UFS card 6530 are connected to the host 6510 is illustrated by way of example. However, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 9:
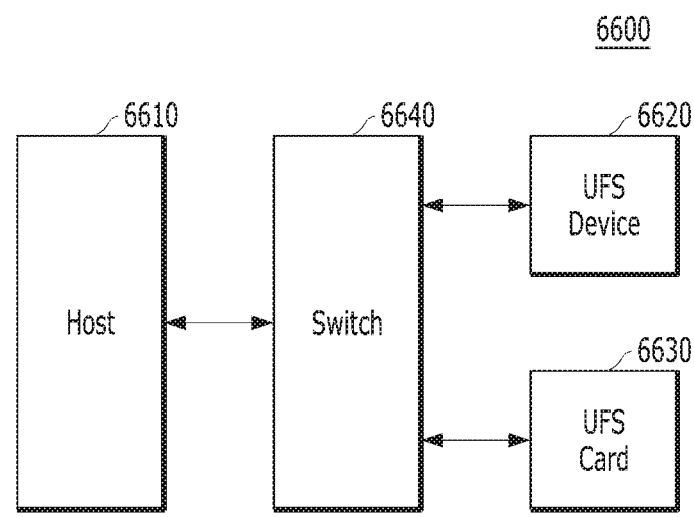

In the UFS system 6600 illustrated in FIG. 9, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In FIG. 9, the configuration in which one UFS device 6620 and one UFS card 6630 are connected to the switching module 6640 is illustrated by way of example. However, a plurality of UFS devices and UFS cards may be connected in parallel or in the form of a star to the switching module 6640, and a plurality of UFS cards may be connected in series or in the form of a chain to the UFS device 6620.

In the UFS system 6700 illustrated in FIG. 10, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In FIG. 10, the configuration in which one UFS device 6720 and one UFS card 6730 are connected to the switching module 6740 is illustrated by way of example. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 11:
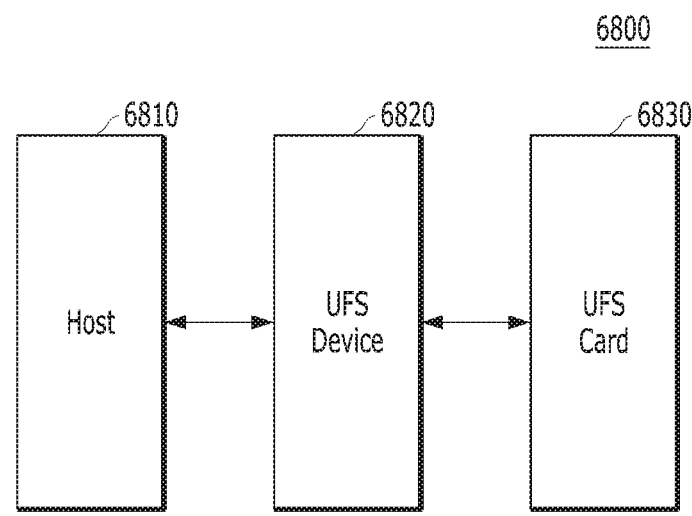

In the UFS system 6800 illustrated in FIG. 11, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In FIG. 11, the configuration in which one UFS device 6820 is connected to the host 6810 and one UFS card 6830 is connected to the UFS device 6820 is illustrated by way of example. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 12:
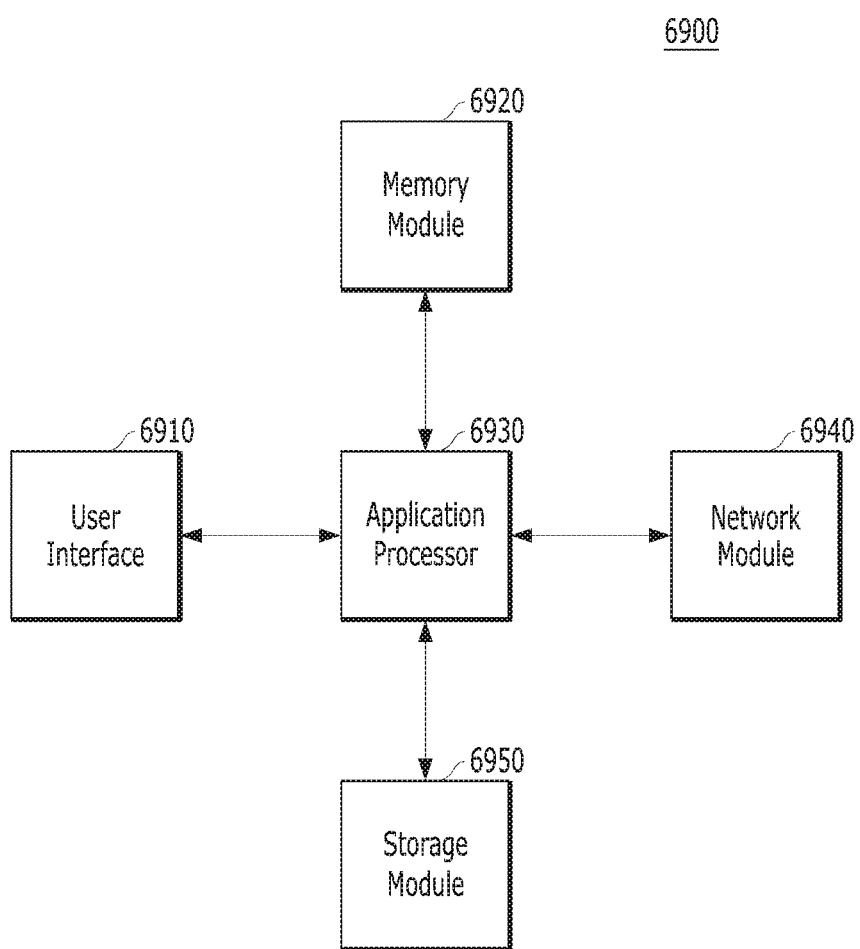

FIG. 12 is a diagram schematically illustrating another example of the data processing system including the memory system in accordance with an embodiment. FIG. 12 is a diagram schematically illustrating a user system 6900 to which the memory system may be applied.

Referring to FIG. 12, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM), such as a dynamic RAM (DRAM), a synchronous DRAM (SDRAM), a double data rate (DDR) SDRAM, DDR2 SDRAM, DDR3 SDRAM, LPDDR SDARM, LPDDR2 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device, such as a phase-change RAM (PRAM), a magnetic RAM (MRAM), a resistive RAM (ReRAM), a NAND flash, NOR flash and/or 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 6 to 11.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a monitor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the application processor 6930 on a display/touch module of the mobile electronic device, or support a function of receiving data from the touch panel.

In an embodiment, the storage module 6950 may operate in the power saving mode depending on whether the current time is within the inactive time zone, and thus reduce power consumption of the storage module 6950 while still maintaining performance when needed by users.

In accordance with the present embodiments, it is possible to provide a memory system capable of saving power consumption and an operation method thereof.

Although various embodiments have been described and illustrated, it will be apparent to those skilled in the art in light of the present disclosure that various changes and modifications may be made without departing from the spirit and scope of the invention as defined in the following claims.

What is claimed is:

1. A memory system comprising:
 a memory device suitable for storing data; and
 a controller suitable for controlling the memory device,
 wherein the controller comprises:
 a power manager suitable for deciding whether to operate in a power saving mode based on current time being within a scheduled time period;
 a phase locked loop suitable for generating a clock whose frequency is lowered depending on the deciding whether to operate in the power saving mode; and
 a processor suitable for operating at speed based on the clock.

2. The memory system of claim 1, wherein the power manager determines the current time based on time information received from a host.

3. The memory system of claim 1, wherein the power manager further decides whether to exit the power saving mode based on the current time,
 the phase locked loop generates a normal clock whose frequency is restored depending on the deciding whether to exit the power saving mode, and
 the processor operates at speed based on the normal clock.

4. The memory system of claim 1, wherein the controller further comprises a memory, and
 the power manager stops power supply to a part of the memory depending on the deciding whether to operate in the power saving mode.

5. The memory system of claim 1, wherein the power manager decides whether to operate in the power saving mode when the current time which has been in an active time zone enters an inactive time zone.

6. The memory system of claim 3, wherein the power manager decides whether to exit the power saving mode when the current time which has been in an inactive time zone enters an active time zone.

7. The memory system of claim 4, wherein the power manager controls the memory and the memory device to flush data of the part of the memory to the memory device, before stopping power supply to the part of the memory.

8. The memory system of claim 4, wherein the power manager further decides whether to exit the power saving mode based on the current time, and resumes power supply to the part of the memory depending on the deciding whether to exit the power saving mode.

9. The memory system of claim 5, wherein the active time zone is the daytime, and the inactive time zone is the nighttime.

10. An operation method of a memory system which includes a memory device and a controller suitable for controlling the memory device, the operation method comprising:
deciding whether to operate in a power saving mode based on current time being within a scheduled time period;
lowering the frequency of a clock to generate a low frequency clock when deciding to operate in the power saving mode; and
operating at a decreased speed based on the low frequency clock.

11. The operation method of claim 10, further comprising determining the current time based on time information received from a host.

12. The operation method of claim 10, further comprising:
deciding whether to exit the power saving mode based on the current time;
increasing the previously lowered frequency of the clock to generate a normal clock when deciding to exit the power saving mode; and
operating at an increased speed based on the normal clock.

13. The operation method of claim 10, further comprising stopping supply of power to a part of the memory of the controller when deciding to operate in the power saving mode.

14. The operation method of claim 10, wherein the deciding of whether to operate in the power saving mode based on the current time comprises deciding whether to operate in the power saving mode when the current time which has been in an active time zone enters an inactive time zone.

15. The operation method of claim 12, wherein the deciding of whether to cancel the power saving mode based on the current time comprises deciding whether to cancel the power saving mode when the current time which has been in an inactive time zone enters an active time zone.

16. The operation method of claim 13, further comprising flushing data of the part of a memory to the memory device before stopping supply of power to the part of the memory.

17. The operation method of claim 13, further comprising:
deciding whether to exit the power saving mode based on the current time; and
resuming supply of power to the part of the memory when deciding to exit the power saving mode.

18. The operation method of claim 14, wherein the active time zone is the daytime, and the inactive time zone is the nighttime.

19. A controller for controlling a memory device, the controller comprising:
a phase locked loop suitable for generating a clock;
a processor suitable for operating in response to the clock; and
a power manager suitable for receiving time information regarding a current time being within a scheduled time period from a host and generating a signal based on the time information,
wherein the phase locked loop decreases a frequency of the clock in response to the signal.

20. The controller of claim 19, wherein the power manager generates the signal when the time information indicates that the current time is within an inactive time period.

21. A controller comprising:
a power manager suitable for deciding whether to operate in a power saving mode based on current time being within a scheduled time period;
a phase locked loop suitable for generating a clock whose frequency is lowered depending on the deciding whether to operate in the power saving mode; and
a processor suitable for operating at speed based on the clock.

* * * * *